No. 742,016. PATENTED OCT. 20, 1903.
W. FETZER.
SEED STIRRING MECHANISM.
APPLICATION FILED MAY 28, 1903.
NO MODEL.

Witnesses
L. Gusford Handy
William T. Jones.

Inventor
William Fetzer
By Mason Fenwick Lawrence
Attorneys

No. 742,016.                                                          Patented October 20, 1903.

UNITED STATES PATENT OFFICE.

WILLIAM FETZER, OF MIDDLETOWN, OHIO.

SEED-STIRRING MECHANISM.

SPECIFICATION forming part of Letters Patent No. 742,016, dated October 20, 1903.

Application filed May 28, 1903. Serial No. 159,160. (No model.)

*To all whom it may concern:*

Be it known that I, WILLIAM FETZER, a citizen of the United States, residing at Middletown, in the county of Butler and State of Ohio, have invented certain new and useful Improvements in Seed-Stirring Mechanism; and I do hereby declare the following to be a full, clear, and exact description of the invention, such as will enable others skilled in the art to which it appertains to make and use the same.

This invention relates to improvements in grain-drills, and particularly to seed stirring or agitating mechanism therefor.

The object in view is the provision of a device for maintaining light seed—such as oats, grass-seed, and the like—in a condition for readily and easily feeding down through the cups from the hopper.

With this and further objects in view the invention consists, in combination with a hopper and a power-shaft, of a finger carried by and projecting from said shaft and stirring means extending at an angle to said finger.

It further consists, in combination with an operating-shaft and hopper, of a sleeve carried by said shaft, an agitating-arm projecting from said sleeve, and propeller-webs extending from said sleeve.

It also consists in certain other novel constructions, combination, and arrangement of parts, as will be hereinafter fully described and claimed.

Figure 1:
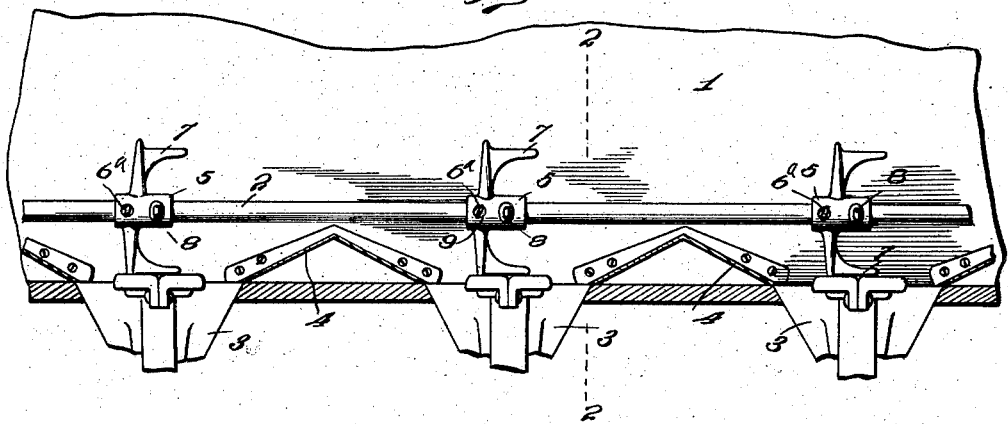
Figure 2:
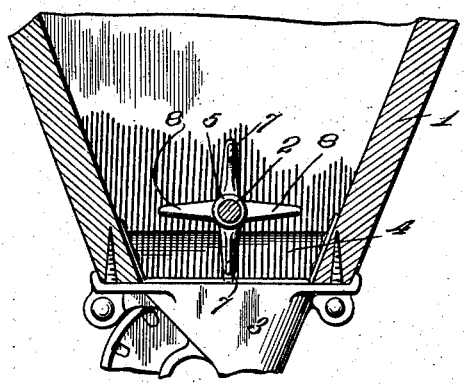
Figure 3:
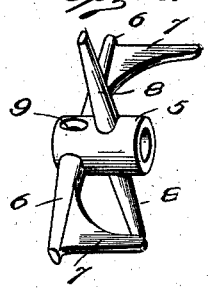
Figure 4:
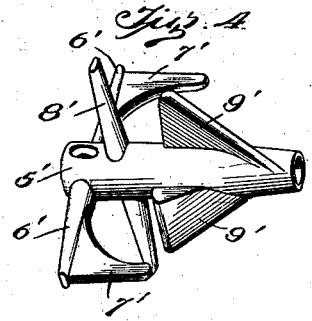

In the accompanying drawings, Figure 1 represents a fragmentary sectional view of a hopper, showing a portion of the cups and illustrating a plurality of stirrers each embodying the features of the present invention. Fig. 2 represents a transverse section taken on the plane of line 2 2 of Fig. 1. Fig. 3 represents an enlarged detail perspective view of a detached stirrer embodying the features of the present invention. Fig. 4 represents a similar view of a slightly-modified form of the same.

In the drilling of light seeds it is found desirable to maintain the same continuously agitated in order that they may not pack above the cup. In order to accomplish this result to the best advantage, I preferably employ the elements illustrated in the accompanying drawings, in which 1 indicates a suitable grain-hopper, extending longitudinally of which is a suitable power or operating shaft 2. Spaced apart along the length of the hopper 1 and opening into the bottom thereof are any suitable number of the ordinary type of seed-cups 3, between each two of which cups is arranged an elevated portion 4, slanting from a central point in each direction down to the edge of the respective cup. This slanting wall or raised portion facilitates feeding of grain to the cups; but in the planting of the lighter seeds it is found that the same are liable to be directed in such quantities into the cups as to become packed, and thereby fail to be properly discharged. I provide a sleeve 5, which surrounds the shaft 2 above each of the cups 3 and is fixed thereto simply by a cotter-pin $6^a$ extending through a suitable aperture 9, formed in said sleeve, and through said shaft 2. Projecting radially from the sleeve 5 are the fingers 6 6, carrying laterally-projecting stirring fingers or webs 7 7, extending, preferably, at right angles to the fingers 6 and projecting from the outer ends thereof. These fingers or webs 7, as illustrated, may have considerable width at the point of juncture with the fingers 6; but of course the same may be made in the form of rods, if desired. Also extending radially from the sleeve 5 are auxiliary fingers 8 8, which materially assist in the operation of stirring seed by coacting with the fingers or webs 7, said auxiliary fingers 8 extending from the sleeve 5 in a different transverse plane from that occupied by fingers 6.

As illustrated in Fig. 4, I may employ a sleeve 5', provided with suitable fingers 6', carrying stirring members 7' similar in all respects to the construction just described. The sleeve 5' may also be provided with fingers 8' similar to the fingers 8, and in the rear of the said fingers 8' I provide spiral propeller-shaped webs 9', carried by and projecting from the sleeve 5'.

In operation as the said shaft 2 rotates the stirring member 7 passes about within the seed contained within the hopper 1, lifting the same on one side and pressing the same down into the seed-cup 3 upon the other, the auxiliary fingers 8 assisting in loosening the said seed. When the construction illustrated in Fig. 4 is employed, the webs 9' continuously tend to drive the seed rearwardly over the elevation 4, whereby the seed is kept thoroughly agitated and free from any possible danger of clogging. Although the webs 9' assist in maintaining the seed in a loosened condition, they are further useful in retaining the same in an even condition throughout the length of the hopper 1. I find it desirable at times to employ the construction without the webs and desire it to be understood that I do not limit myself to this feature of my invention and shall feel at liberty to alter the shape and minor points of the remainder of the stirrer without deviation in the slightest from the spirit and scope of the present invention.

Having thus fully described my invention, what I claim as new, and desire to secure by Letters Patent, is—

1. In a mechanism of the class described, the combination with a hopper and an operating-shaft, of a finger projecting therefrom, a web carried by said finger, and a second finger projecting from said shaft into the path of movement of said stirring means.

2. In a mechanism of the class described, the combination with a hopper and an operating-shaft, of a finger extending from said shaft, a stirring-web extending at right angles from and carried by said finger, and a second finger projecting from said shaft and in a transverse plane other than that occupied by the first-mentioned finger.

3. In a mechanism of the class described, the combination with a hopper and an operating-shaft, of a sleeve surrounding said shaft, fingers projecting radially from said sleeve, webs carried by some of said fingers, and other fingers projecting from said sleeve into the path of movement of said stirring-webs.

4. A grain-stirrer comprising a sleeve, fingers projecting therefrom, webs carried by said fingers and extending at right angles thereto, and other fingers projecting from said sleeve outside the transverse plane of the sleeve occupied by the first-mentioned fingers.

5. An agitator comprising a collar, fingers secured thereto, parts of which are provided with webs, extending therefrom in the same transverse plane and from the same side.

6. An agitator comprising a collar, and a number of fingers and spiral webs formed integral with said collar.

7. In a device of the character described the combination, of a hopper, an operating-shaft mounted therein and a collar keyed to said shaft provided with stirring means and separate propelling means formed integral therewith.

8. An agitator comprising a sleeve, stirring means and separate propelling means carried by said sleeve.

In testimony whereof I hereunto affix my signature in presence of two witnesses.

WILLIAM FETZER.

Witnesses:
LAWRENCE WOLVERTON,
M. F. RICHARDSON, Jr.